United States Patent

Lindquist et al.

[11] Patent Number: 5,916,959
[45] Date of Patent: *Jun. 29, 1999

[54] RADIAL STYRENE-ISOPRENE-STYRENE BASED HOT MELT PRESSURE SENSITIVE ADHESIVE

[75] Inventors: Jeffrey S. Lindquist, Cottage Grove; Keith C. Knutson, Shoreview, both of Minn.

[73] Assignee: H.B. Fuller Licensing & Financing, Inc., St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/625,739

[22] Filed: Mar. 29, 1996

[51] Int. Cl.⁶ ..................................... C08J 55/00
[52] U.S. Cl. ............................. 524/505
[58] Field of Search .............................. 524/505

[56] References Cited

U.S. PATENT DOCUMENTS

| | | | |
|---|---|---|---|
| 4,136,699 | 1/1979 | Collins et al. | 128/290 RO |
| 4,411,954 | 10/1983 | Butch, III et al. | 428/343 |
| 4,460,364 | 7/1984 | Chen et al. | 604/387 |
| 4,526,577 | 7/1985 | Schmidt, Jr. et al. | 604/366 |
| 4,578,302 | 3/1986 | Schmidt, Jr. et al. | 428/110 |
| 4,619,851 | 10/1986 | Sasaki et al. | 428/40 |
| 4,714,749 | 12/1987 | Hughes et al. | 526/290 |
| 4,944,994 | 7/1990 | Flanagan | 428/290 |
| 5,024,667 | 6/1991 | Malcolm et al. | 604/382 |
| 5,037,411 | 8/1991 | Malcolm et al. | 604/358 |
| 5,057,571 | 10/1991 | Malcolm et al. | 524/505 |
| 5,143,968 | 9/1992 | Diehl et al. | 524/534 |
| 5,169,706 | 12/1992 | Collier, IV et al. | 525/314 |
| 5,292,819 | 3/1994 | Diehl et al. | 525/314 |
| 5,358,783 | 10/1994 | Diehl et al. | 428/344 |
| 5,360,854 | 11/1994 | Bozich, Jr. | 524/274 |
| 5,399,627 | 3/1995 | Diehl et al. | 525/314 |

*Primary Examiner*—Peter D. Mulcahy
*Attorney, Agent, or Firm*—Lisa L. Ryan

[57] ABSTRACT

A hot melt adhesive composition comprising from about 5% to about 15% by weight of at least one radial styrene-isoprene-styrene block copolymer having the general configuration $(pS—pI—pB)_nX$ wherein n is a number greater than 2, said block copolymer having a molecular weight from about 90,000 to about 380,000, and preferably from about 100,000 to about 250,000, and a styrene content from about 15% to about 35% by weight, and preferably from about 20% to about 30% by weight; up to about 10% of a compatible polymer, wherein the total polymer content does not exceed 15%; from about 30% to about 60% by weight of at least one compatible tackifying resin; from about 20% to about 40% by weight of at least one compatible plasticizer; and from about 0.1% to about 2% by weight stabilizer.

16 Claims, 3 Drawing Sheets

RADIAL STYRENE-ISOPRENE-STYRENE BASED HOT MELT PRESSURE SENSITIVE ADHESIVE

FIELD OF THE INVENTION

This invention relates to a hot melt adhesive composition comprising a novel radial styrene-isoprene-styrene block copolymer that is useful as a labeling adhesive, especially in the bottle labeling area.

BACKGROUND OF THE INVENTION

Hot melt pressure sensitive compositions are used widely in the adhesive industry due to their ability to adhere to a wide variety of substrates. Block copolymers are a preferred base due to their good heat stability, high adhesive strength, elastomeric properties, and compatibility with a wide range of tackifiers and plasticizers. A primary property of a hot melt pressure sensitive composition is that it remains tacky at room temperature and can be adhered to substrates when it has completely cooled from its molten state.

Applications requiring this property include labeling. Paper, polyethylene, polypropylene, polystyrene, composites or laminates, or other such substrates may be coated with the hot melt pressure sensitive adhesive, which is then covered with release liner, and then shipped for later application of the labels to substrates such as various containers, books, magazines, corrugated boxes, and envelopes to name just a few.

In addition to the types of labeling mentioned above, there is also bottle and container labeling where the hot melt adhesive is applied to the bottle or container itself, and the label is then adhered to such bottle or container on-line. The labels are not precoated and shipped as in the examples above. The most widely used materials for bottles or containers include, but are not limited to, glass, polyethylene terephthalate or "PET", polyethylene, polypropylene, and polyvinyl chloride (PVC). Such materials are generally difficult to bond, and the use of block copolymers as the adhesive base will facilitate the bonding.

Hot melts for bottle labeling are generally characterized by having low viscosities and long open times. Low viscosities are required because of the types of equipment used for bottle labeling and the restrictions that this equipment imposes. The equipment is run at very high speeds and stringing of the adhesive will occur if the viscosities are too high. Line speeds can be as high as 1000 bottles/minute.

These adhesives are further characterized by having good cold temperature flexibility, and excellent adhesion to a wide variety of substrates. Good cold temperature flexibility and excellent bondability are required because the bottles or containers are often for beverages, and are filled on-line prior to labeling. These containers are therefore often cold and wet which puts further demands on the adhesive. Bottle expansion which occurs during filling requires that the adhesive have good flexibility.

In addition, these adhesives require good heat resistance for shipping and for storage in the summer months. Temperatures inside shipping vehicles can exceed 50° C. It can be difficult to achieve high heat resistance while maintaining good cold temperature flexibility, long open times, and very low viscosities because these characteristics work in opposition to each other.

A recent trend for bottle labeling manufacturers is to reduce costs by using lower gauge substrates. These substrates are often polyethylene, polypropylene, or composites of such materials which are heat sensitive. As the gauge of the film decreases, the films become more heat sensitive. Adhesive application temperatures must also be decreased, and optimum temperatures for these films are between about 120° C. and about 150° C. Conventional hot melt adhesives are applied at temperatures of about 155° C. to about 175° C. Viscosities of these conventional hot melt adhesives would be optimal, therefore, at temperatures of greater than about 155° C. These hot melts could therefore not be applied at temperatures of less than about 150° C. without machining difficulties such as stringing of the hot melt adhesive and nozzle clogging. As temperatures are decreased, it is also more difficult to get good adhesion to difficult substrates. It is, therefore, an advance in the art to offer hot melt adhesives that can be applied at lower temperatures while maintaining the characteristics of conventional hot melt adhesives such as good adhesion and high heat resistance.

U.S. Pat. No. 5,292,819 to Diehl et al., issued Mar. 8, 1994, discloses the use of a radial styrene-isoprene-styrene (S—I—S) block copolymer having the general configuration $(pS-pI-pB)_n X$ where n is a number greater than 2 for use in various hot melt applications such as for disposable articles. However, Diehl does not teach the use of these polymers in hot melt adhesives for labeling applications. The adhesive formulations that Diehl teaches could not in fact be used for labeling applications because of the viscosity constraints imposed by hot melt labeling. The formulations of this invention have higher polymer contents and are too high in viscosity.

U.S. Pat. No. 5,399,627 to Diehl et al., issued Mar. 21, 1995, discloses the use of a radial S—I—S block copolymer having the general configuration $(pS-pI-pB)_n X$ where n is a number greater than 2, for use in hot melt adhesives for tapes. The physical characteristics for a hot melt tape adhesive are vastly different than the physical characteristics of a hot melt labeling adhesive. Diehl teaches hot melt adhesives that would be too high in viscosity for application temperatures of about 120° C. to about 150° C. These adhesives would also be much too high in viscosity for running on high speed labeling equipment.

Similarly, U.S. Pat. No. 4,411,954 to Butch, III et al., issued Oct. 25, 1983, discloses a styrene-isoprene-styrene based hot melt pressure sensitive hot melt adhesive for diaper tape closures. These adhesives again would be much too high in viscosity to be run on high speed labeling equipment. The viscosities of this invention are shown to be greater than about 6000 cPs at about 163° C. in contrast to the adhesives of the present invention where the viscosity is less than about 3000 cPs at 120° C.

U.S. Pat. No. 5,057,571 to Malcolm et al., issued Oct. 15, 1991, discloses the use of a radial block copolymer having the general configuration $(A-B)_{n1}-Y-(B)_{n2}$ where the A block comprises styrene and the B block comprises butadiene, isoprene, or mixtures thereof for disposable article construction. Malcolm does not teach the use of these products for labeling applications. Malcolm teaches hot melt compositions that would be much too high in viscosity for labeling applications. The adhesive compositions of Malcolm et al. disclose adhesive compositions that are greater than about 6,000 cPs at about 135° C. in contrast to compositions of the present invention which have viscosities of less than about 3,000 cPs at about 120° C. Therefore, the compositions of Malcolm et al. could not be used for applications where the requirements are for very low viscosities such as for bottle labeling.

U.S. Pat. No. 4,619,851 to Sasaki et al., issued Oct. 28, 1986, teaches the use of a combination of a thermoplastic rubber and an aliphatic hydrocarbon resin to achieve a slight incompatibility of the hot melt adhesive to improve die cuttability of labels. The rubber content of this invention is higher than the present invention. These products would be too high in viscosity for use on high speed labeling equipment.

U.S. Pat. No. 4,944,994 to Flanagan, issued Jul. 31, 1990, teaches hot melt pressure sensitive adhesive compositions for use in casemaking for bookbinding. This invention utilizes a radial styrene-butadiene-styrene block copolymer with a styrene content greater than about 35%. This invention does not disclose the use of these products for labeling. These products have high tensile strengths and high modulus which are advantageous for casemaking but would be disadvantageous for labeling applications. In addition, these products would not achieve the high tack properties useful for permanent labeling as in the present invention.

U.S. Pat. No. 4,714,749 to Hughes et al., issued Dec. 22, 1987, discloses the use of a fully saturated petroleum resin in combination with a saturated midblock thermoplastic elastomer such as Kraton™ G. Kraton™ G is a saturated, block copolymer having ethylene-butadiene as the midblock in contrast to the base polymers of the present invention which contain isoprene as the midblock. These adhesives are oil free systems, and contain saturated midblock elastomers in concentrations of greater than about 35% by weight of the total adhesive in contrast to the present invention where the polymer content is from about 5% to about 15% by weight of the adhesive. Hughes et al. does not teach how to make adhesives with very low polymer content. The compositions of Hughes et al. would be much higher in viscosity and not useful for applications where the compositions of the present invention are used.

U.S. Pat. No. 4,460,364 to Chen et al., issued Jul. 17, 1984, teaches the use of rubbery block copolymers as the base for removable pressure sensitive adhesives for sanitary products. Removable PSAs are precoated onto such products as band aids, labels, and pantiliners to name just a few. The PSA is then covered with a release liner to allow for shipping and storage of the finished product. When the finished product is used, the release liner is removed, the product is placed on the desired surface, (person, garment, machine, article, to name a few) and hand pressure is used to adhere the two substrates together. The adhesive, therefore, bonds at ambient temperatures, without heat. This is not a permanent bond, however, and upon removal of the label, band aid, pantiliner, etc., it is desired that no residue should be left on the remaining surface. The desired characteristics of removable PSAs therefore, include aggressive quick stick, which is the ability to immediately adhere to a substrate upon application, lack of residue on the remaining surface, and low peel adhesion. The adhesives of the present invention, in contrast, are permanent grade PSAs used to permanently bond two substrates together rather than forming a temporary bond. They are used to mate two substrates together using application temperatures of greater than about 120° C. but less than about 150° C., rather than at ambient temperatures. The adhesive compositions of Chen et al., have high block copolymer contents, greater than about 18%, and the viscosities would also be much too high in viscosity for high speed labeling equipment. The adhesives of Chen et al., would be applied using such methods as slot die coating or spray application.

U.S. Pat. No. 4,136,699 to Collins et al., issued Jan. 30, 1979, discloses a disposable article for absorbing fluids comprising a hot melt adhesive which contains from about 10% to about 20% by weight of a radial block copolymer having the general configuration, A—B—A, where A is polystyrene, and B is an essentially saturated poly(monoolefin). An example of the midblock would be ethylene-butadiene. These adhesives are also removable PSAs. This is in contrast to the present invention where the B block is isoprene, and the adhesive is a permanent grade PSA.

U.S. Pat. No. 5,360,854 to Bozich, Jr., issued Nov. 1, 1994, discloses a hot melt pressure sensitive adhesive based on styrene-butadiene-styrene block copolymers, such adhesives having high block copolymer contents. In addition, the block copolymer of Bozich contains percent styrene from about 35% to about 55% by weight of the block copolymer. Higher percentages of styrene result in hard block copolymers that are difficult to tackify. These adhesives are also oil free and are high in viscosity. They could not be used in applications where those of the present invention are used.

The present inventors have found that using low amounts of radial S—I—S block copolymers, having the general configuration $(pS—pI—pB)_nX$ or $(pS—pI)_nX$ as the base polymer for hot melt pressure sensitive adhesives allows for low viscosity adhesives that can be applied at temperatures of about 120° C. to about 150° C. while still providing excellent tack, adhesion, flexibility, cohesive strength, and heat resistance.

SUMMARY OF THE INVENTION

The present invention discloses a hot melt pressure sensitive adhesive comprising a) from about 5% to about 15% of at least one radial styrene- isoprene-styrene block copolymer, having the general configuration (pS—pI—pB) $_nX$ or $(pS—pI)_nX$ wherein n is a number greater than 2, said block copolymer having a number average molecular weight from about 90,000 to about 380,000, and preferably from about 100,000 to about 250,000 and a styrene content between about 15% and about 35% by weight of the block copolymer, and preferably from about 5% to about 10% by weight of at least one radial block copolymer; b) up to about 10% by weight of a compatible polymer wherein the total polymer content does not exceed 15%; c) from about 30% to about 60% by weight of at least one compatible tackifying resin; d) from about 20% to about 40% by weight of at least one compatible plasticizer; and e) from about 0.1% to about 2% by weight stabilizer.

Blending of the individual components results in a compatible mixture. Compatible refers generally to a lack of phase separation of the individual components.

The resultant hot melt pressure sensitive adhesives are characterized by viscosities of less than about 3000 cPs at about 120° C., and preferably less than about 2000 cPs at 120° C.; and Shear Adhesion Failure Temperatures of greater than about 50° C., and more preferably greater than about 55° C.

The adhesives of the present invention maintain excellent adhesion, cold temperature flexibility, heat resistance, and cohesive strength while maintaining very low viscosities compared to similar formulations with conventional block copolymers. These adhesives have excellent adhesion to difficult substrates including but not limited to PET, glass, polystyrene, polyethylene, polypropylene, and laminates or composites. These adhesives can be applied at temperatures between about 120° C. and 150° C.

Contrary to the prior art, these polymers are useful in amounts of less than about 15% by weight of the total adhesive formula. The resultant adhesives have very low viscosities, and therefore can be applied at temperatures between about 120° C. and 150° C. In fact, the hot melt pressure sensitive adhesives of the prior art could not be used in the labeling area where the application equipment used requires very low viscosities. They could also not be used for lower gauge films because film distortion occurs with the higher application temperatures required to apply conventional hot melt adhesives. It is, therefore, an advance in the art to provide a hot melt pressure sensitive adhesive that imparts excellent adhesion, high heat resistance, and very low viscosity, allowing it to be applied at low temperatures, when compared to the prior art.

These adhesives can be used in all kinds of applications where pressure sensitive adhesives might be used, and specifically they can be used in the labeling area. These adhesives would be especially useful for bottle labeling, where very low viscosities are required.

DETAILED DESCRIPTION OF THE INVENTION

The radial block copolymers useful herein are those having the general configuration (pS—pI—pB)$_n$X or (pS—pI)$_n$X where pS is polystyrene, pI is polyisoprene, pB is polybutadiene, X is a residue of a multifunctional coupling agent used in the production of the radial block copolymer, and n is a number greater than 2 representing the number of branches appended to X, which are also referred to as arms. The number of branches is preferably 3 to 5, and more preferably 4. It is difficult to obtain a radial block copolymer, however, that has as its composition only molecules with 4 branches. Some molecules with 3 branches and some molecules with 5 branches may also be present. It may also be possible that molecules with other than 3, 4, and 5 branches may be present. It is preferable that the radial block copolymer contains greater than about 60% of the 4 branch molecules. The number average molecular weight is from about 90,000 to about 380,000, and preferably from about 100,000 to about 250,000. Although a preferred molecular weight range is specified for maintaining low viscosities, it would be known to one of skill in the art that a lower amount of a higher molecular weight polymer can be used to achieve the same viscosity range. The styrene content is from about 15% to about 35% of the radial block copolymer, and is preferably from about 20% to about 30%. It is preferable to maintain the styrene content in this range to achieve optimum flexibility. The coupling efficiencies of these polymers are greater than about 60%, and preferably greater than about 70%. Coupling efficiency refers to the amount of triblock present versus diblock in the block copolymer. Coupling efficiency is important in achieving higher heat resistance. The lower the coupling efficiency, the higher the diblock content and the softer the polymer which may result in lower heat resistance. Useful polymers include DPX-550, DPX-551, and DPX-552 polymers available from Dexco Polymers in Houston, Tex.; Kraton™ D-1124 available from Shell Chemical Co. in Houston, Tex.; and Quintac™ SH-108 and Quintac™ 3450 available from Nippon-Zeon in Tokyo, Japan. All are radial styrene-isoprene-styrene polymers. These polymers are useful from about 5% to about 15% by weight and preferably from about 5% to about 10% by weight.

The tackifying resins useful herein can include aliphatic, cycloaliphatic and aromatic hydrocarbon resins and hydrogenated derivatives, and mixtures thereof; rosins and rosin derivatives, and terpenes and modified terpenes, and mixtures thereof. These tackifying resins have a Ring and Ball softening point of between about 70° C. and about 150° C. One skilled in the art would recognize that these tackifying resins are available with differing levels of hydrogenation. Useful resins include Eastotac™ H-100 and H-130 from Eastman Chemical Company which are partially hydrogenated cycloaliphatic petroleum hydrocarbon resin with different softening points; Escorez™ 5300 and Escorez™ 5400, partially hydrogenated cycloaliphatic petroleum hydrocarbon resins, and Escorez™ 5600, a partially hydrogenated aromatic modified petroleum hydrocarbon resin all available from Exxon Chemical Company; Wingtack™ Extra which is an aliphatic, aromatic petroleum hydrocarbon resin available from Goodyear Chemicals; Hercolite™ 2100 which is a partially hydrogenated cycloaliphatic petroleum hydrocarbon resin available from Hercules; Zonatac™ 105 Lite which is a styrenated terpene hydrocarbon resin, made from d-limonene and available from Arizona Chemical; Sylvatac™ 1103 available from Arizona Chemical, Unitac™ R-100 Light available from Union Camp and Permalyn 305 available from Hercules which are all pentaerythritol rosin esters. These tackifiers are useful in the range from about 30% to about 60% by weight in the adhesive.

The compatible polymers useful herein can include A—B—A triblock copolymers, and A—B diblock copolymers, A—B—A—B—A—B multiblock copolymers, and radial block copolymers, and grafted versions thereof; homopolymers, copolymers, and terpolymers of ethylene; and propylene. Block copolymers having the general configuration A—B—A, having styrene endblocks and ethylene-butadiene midblocks, described in Collins et al., U.S. Pat. No. 4,136,699, would be useful in amounts of less than about 5% by weight in the adhesive. These polymers are available under the trade name of Kraton™ G commercially available from Shell Chemical Co., located in Houston, Tex. One skilled in the art would recognize that there are various grades of Kraton™ G available for use. Some examples include Kraton™ G-1726, Kraton™ G-1657, Kraton™ G-1652, and Kraton™ G-1650, saturated A—B diblock/A—B—A triblock mixtures with ethylene-butadiene midblocks; Kraton™ D-1112, a high percent A—B diblock linear styrene-isoprene-styrene polymer; Kraton™ D-1107 and Kraton™ D-1111, primarily A—B—A triblock linear styrene-isoprene-styrene polymers; Stereon™ 840A and Stereon 841A, an A—B—A—B—A—B multiblock styrene-butadiene-styrene polymer available from Firestone located in Akron, Ohio; Europrene™ Sol T 193B, a linear styrene-isoprene-styrene polymer available from Enichem Elastomers in New York, N.Y.; Europrene™ Sol T 163, a radial styrene-butadiene-styrene polymer also available from Enichem Elastomers; Vector™ 4461 -D, a linear styrene-butadiene-styrene polymer available from Exxon Chemical Co. in Houston, Tex.; Vector™ 4111, 4211, and 4411, fully coupled linear styrene-isoprene-styrene polymers containing different weight percentages of styrene endblock; and Vector™ 4113, a highly coupled linear styrene-isoprene-styrene polymer also available from Exxon Chemical Co. Other polymers, such as homopolymers, copolymers and terpolymers of ethylene, and polypropylene may be useful in amounts of less than about 5% by weight in the adhesive. Some examples include ethylene vinyl acetate copolymers such as Elvax™ 410 and Elvax™ 210 available from DuPont Chemical Co. located in Wilmington, Del.; Escorene UL 7505 available from Exxon Chemical Co.; Ultrathene UE 64904 available from Quantum Chemical Corp. in Rolling Meadows, Ill.; and AT 1850M available from AT Polymers & Film Co. in Charlotte, N.C. Other useful polymers include Exact 5008, an ethylene-butene polymer; Exxpol SLP-0394, an ethylene-propylene polymer; Exact 3031, an ethylene-hexene polymer all available from Exxon Chemical Co.; and Insight SM-8400, an ethylene-octene polymer available from Dow Chemical Co. located in Midland, Mich. These compatible polymers are useful up to about 10% by weight.

A minimum amount of plasticizer is necessary to the present invention. Plasticizers may include oil, liquid resins, liquid elastomers, or any other material which flows at ambient temperatures and is compatible with the block copolymer. A plasticizer is broadly defined as a typically organic composition that can be added to thermoplastics, rubbers, and other resins to improve extrudability, flexibility, workability, or stretchability.

The plasticizers useful herein can include mineral or petroleum based hydrocarbon oils, polybutene, liquid tackifying resins, liquid elastomers, or functionalized oils such as glyceryl trihydroxyoleate or other fatty oils. The oils used are primarily hydrocarbon oils, are low in aromatic content and are paraffinic or napthenic in character. The oils are preferably low in volatility, transparent, and have as little color and odor as possible. This invention also contemplates the use of olefin oligomers, low molecular weight polymers, vegetable oils and their derivatives and similar plasticizing liquids. These plasticizers are useful in amounts of from about 20% to about 40% by weight.

Examples of useful plasticizers include Calsol™ 5120, a naphthenic petroleum based oil available from Calumet Lubricants Co. in Indianapolis, Ind.; Kaydol™ White Mineral Oil, a paraffinic mineral oil available from Witco Corp. in New York, N.Y.; Parapol™ 1300, a liquid butene homopolymer available from Exxon Chemical Co. in Houston, Tex.; Indopol H-300, a liquid butene homopolymer, available from Amoco Corp. in Chicago, Ill.; Escorez 2520, a liquid aromatic petroleum based hydrocarbon resin with a pour point of 20° C., available from Exxon Chemical Co.; Regalrez 1018, a liquid hydrogenated aromatic hydrocarbon resin with a pour point of 18° C., available from Hercules, Inc. in Chicago, Ill.; and Sylvatac 5N, a liquid resin of modified rosin ester with a pour point of 5° C., available from Arizona Chemical Co. in Panama City, Fla. One skilled in the art would recognize that any generic 500 second or 1200 second naphthenic process oil would also be useful.

A stabilizer or antioxidant can also be used in hot melt adhesives. These compounds are added to protect the adhesive from degradation caused by reaction with oxygen induced by such things as heat, light, or residual catalyst from the raw materials such as the tackifying resin. Such antioxidants are commercially available from Ciba-Geigy and include Irganox™ 1010 and Irganox™ 1076 which are hindered phenols. These are primary antioxidants which act as radical scavengers and may be used alone or in combination with other antioxidants such as phosphite antioxidants like Irgafos™ 168 available from Ciba-Geigy. Phosphite catalysts are considered secondary catalysts and are not generally used alone. These are primarily used as peroxide decomposers. Other available catalysts are Cyanox™ LTDP available from American Cyanamide, and Ethanox™ 1330 available from Albemarle. Many such antioxidants are available either to be used alone or in combination with other such antioxidants. These compounds are added to the hot melts in small amounts and have no effect on the other physical properties. Other compounds that could be added that also do not affect physical properties are pigments which add color, or fluorescing agents, to mention only a couple. Additives like these are known to those skilled in the art. The adhesive of the present invention is useful in labeling, including bottle labeling, and other uses.

The adhesives of the present invention are characterized by excellent heat resistance, cold temperature flexibility and bondability, and low viscosities.

Low viscosities are required for high speed labeling applications, and where equipment constraints prevent the use of high viscosity material. If an adhesive is too high in viscosity for a particular application, poor machining of the adhesive occurs which is manifested in stringing, or angel hair, and nozzle clogging. The adhesives of the present invention have viscosities of less than about 3000 cPs at 120° C.

Low viscosities also allow for lower application temperatures. A standard application temperature is greater than about 150° C. The adhesives of the present invention may be applied at temperatures of greater than about 120° C. The recent trend in the labeling industry has been to use lower gauge films as a cost savings. Lower gauge films distort easier with heat and therefore require lower application temperatures.

High heat resistance is required for shipping and storage in summer months when temperatures in vehicles or warehouses may exceed 50° C. Heat resistance can be measured by Shear Adhesion Failure Temperature or SAFT. The adhesives of the present invention are characterized by SAFT values of greater than about 50° C., and preferably greater than about 55° C.

Cold temperature flexibility is required for shipping and storage in the winter months. It is also necessary for bottle labeling where bottles are being filled with cold beverages, and the conditions in the plant may be cold with a lot of condensation. Cold temperature flexibility may be characterized by the glass transition temperature or Tg. The adhesives of the present invention have Tg values comparable to adhesives of the prior art, while having superior heat resistance to those of the prior art. This is a desirable characteristic.

The invention is further illustrated by the following non-limiting examples.

EXAMPLES 1–3 And Comparative Examples A–I and K–P

Test Methods
1. Melt Viscosities

The melt viscosities of the hot melt adhesives were determined on a Brookfield Thermosel Viscometer Model DVI using a number 21 spindle.

2. Shear Adhesion Failure Temperature (SAFT)

The adhesive is cast from a solvent blend as a 1 mil film using a Baker Applicator on a 2 mil gauge polyester (Mylar™) film. The adhesive to solvent ratio is generally 1:1. The adhesive film is allowed to dry. Release liner is placed over the top of the film and 4 inch squares are then cut from the film. A 1 inch×4 inch area is marked and mylar film is placed over the top of this. This is then cut into four samples, each having a 1 inch×1 inch bonded area. The bonds are allowed to dwell for 12 hours and are then placed in a programmed oven with a 500g weight using a shear mode. The oven is started at 25° C. and is ramped at 25° C. per hour for three hours. The oven automatically records the temperature at which the samples fail cohesively.

3. 180° Peel Adhesion To Stainless Steel

Peel values were determined using test method #PSTC-1. About 1 mil adhesive film is coated onto polyester (Mylar™) film out of a solvent blend using a Baker Applicator. Samples are then cut into 1 inch×8 inch strips for determining peel values.

4. Loop Tack Testing

About 1 mil adhesive film is coated onto polyester (Mylar™) film out of a solvent blend using a Baker Applicator. The film is allowed to dry for a minimum of 24 hours. The film is then mated with release liner, and cut into 1 inch×5 inch strips. A test sample is then inserted into a Chemsultants International Loop Tack Tester with the adhesive side facing out (release liner removed). The Loop Tack Tester automatically records the tack value in oz/in$^2$.

5. Rheological Measurement Of Polymer Melts Using Dynamic Mechanical Procedures

Rheological data was determined using ASTM method D4440-84. A standard step test was used versus continuous temperature ramping. The dwell time was 2.5 minutes temperature before each run. The frequency was 10 radians/second.

6. Molten Gardner Color

ASTM Method D 1544 is used to measure Molten Gardner Colors with a Gardner Delta Illuminator and a Gardner Delta Comparator made by Pacific Scientific Gardner Laboratory Division in Bethesda, Md.

The adhesives of the present invention are characterized by viscosities of less than about 3000 cPs at about 175° C., SAFT values of greater than about 50° C., and preferably greater than about 55° C., and Tg values of less than about 20° C., and preferably less than about 10° C.

The adhesive examples of the invention are also clear and essentially colorless, having Molten Gardner Colors of less than about 3. This is advantageous where the label stock is also clear. The adhesive user would prefer adhesives that could not be seen through the label. For applications in which color is not an important factor, other raw materials, such as different tackifiers, may be used which would result in higher Molten Gardner Color.

The adhesive samples were prepared by first making a preblend of a 1:1 rubber to tackifier mixture. This was prepared on a high shear sigma blade mixer manufactured by Littleford Day located in Florence, Ky. The preblend is then slowly added to approximately 60 grams of tackifying resin using a single blade mixer heated to about 175° C. These single blade mixers may also be characterized as upright or lightening mixers. The rest of the components, including remaining tackifying resin, if any, are then slowly added and the resultant blend is mixed until homogeneous.

Example 1 and Comparative Examples A–I

This example illustrates the superior high heat resistance that can be obtained using the radial styrene-isoprene-styrene polymer of the invention, while maintaining a low viscosity profile, as compared to conventional block polymers. All of the test adhesives have been formulated with a polymer level of 10% by weight in the adhesive. The heat resistance is measured using a Shear Adhesion Failure Temperature Test (SAFT). Comparative Example I has a viscosity that is much higher than any of the other Examples as is indicated in Table 1 as high.

TABLE 1

| Adhesive Components | A | B | C | D | E | F | G | H | I | 1 |
|---|---|---|---|---|---|---|---|---|---|---|
| Escorez 5600 | 60 | 60 | 60 | 60 | 60 | 60 | 60 | 60 | 60 | 60 |
| Polybutane (Indopol H-300) | 3.8 | 3.8 | 3.8 | 3.8 | 3.8 | 3.8 | 3.8 | 3.8 | 3.8 | 3.8 |
| Irganox 1010 | 0.2 | 0.2 | 0.2 | 0.2 | 0.2 | 0.2 | 0.2 | 0.2 | 0.2 | 0.2 |
| Kaydol Oil | 26 | 26 | 26 | 26 | 26 | 26 | 26 | 26 | 26 | 26 |
| Linear SIS (Sol T 193B) | 10 | | | | | | | | | |
| Linear SIS (Kraton D-1112) | | 10 | | | | | | | | |
| Linear SIS (Vector 4211) | | | 10 | | | | | | | |
| Linear SIS (Vector 4411) | | | | 10 | | | | | | |
| Linear SIS (Vector 4111) | | | | | 10 | | | | | |
| Linear SIS (Kraton D-1107) | | | | | | 10 | | | | |
| Linear SEB (Kraton G-1726) | | | | | | | 10 | | | |
| Linear SEBS (Kraton G-1652) | | | | | | | | 10 | | |
| Linear SEBS (Kraton G-1650) | | | | | | | | | 10 | |
| Radial SIS (DPX-552) | | | | | | | | | | 10 |
| Viscosity @ 250° F. | 1300 | 1550 | 1250 | 1050 | 1625 | 1675 | 930 | 2025 | High | 1650 |
| Viscosity @ 300° F. | 410 | 475 | 375 | 300 | 520 | 535 | 245 | 550 | High | 550 |
| SAFT | 124 | 104 | 129 | 134 | 114 | 107 | 88 | 107 | 129 | 140 |

Example 2 and Comparative Examples K–N

Example 2 also shows the high heat resistance that can be achieved using a radial styrene-isoprene-styrene polymer of the invention compared to conventional block polymers, while maintaining a low viscosity profile. The polymer content for all formulations was 10% by weight in the adhesive.

TABLE 2

| Adhesive Components | K | L | M | N | 2 |
|---|---|---|---|---|---|
| Eastotac H-100 | 60 | 60 | 60 | 60 | 60 |
| Naphthenic 500s Process Oil | 30 | 30 | 30 | 30 | 30 |
| Linear SIS (Vector 4113) | 10 | | | | |
| Linear SIS (Vector 4111) | | 10 | | | |
| Linear SIS (Vector 4211) | | | 10 | | |
| Linear SIS (Vector 4411) | | | | 10 | |
| Radial SIS (DPX-552) | | | | | 10 |
| Viscosity @ 300° F. | 155 | 440 | 320 | 260 | 400 |
| SAFT | 88 | 119 | 134 | 133 | 146 |

Example 3 and Comparative Examples O & P

The following example illustrates the high heat resistance that can be obtained using a low percent by weight of the radial styrene-isoprene-styrene polymer compared to using a higher percent by weight of a linear styrene-butadiene-styrene polymer or a styrene-ethylene-butadiene-styrene polymer. A much lower viscosity is obtained using lower amounts of the styrene-isoprene-styrene polymer and superior heat resistance can still be achieved.

TABLE 3

| Adhesive Components | O | P | 3 |
|---|---|---|---|
| Rubber Type | SBS | SEBS | Radial SIS |
| Escorez 5400 | — | — | 12.0 |
| Escorez 5600 | — | 39.0 | 45.0 |
| Regalrez 1018 | — | 22.5 | — |
| Sylvatac 1103 | 58.5 | — | — |
| Kaydol Oil | 24.0 | 15.0 | 26.0 |
| Parapol 1300 | — | — | 3.0 |
| Kraton G 1726 | — | 17.5 | 3.0 |
| Kraton G 1657 | — | 5.0 | — |
| Stereon 840A | 16.5 | — | — |
| DPX-552 | — | — | 10.0 |
| Antioxidant | 1.0 | 1.0 | 1.0 |
| Viscosity @ 300° F. | 790 | 1,650 | 450 |
| SAFT | 119 | 110 | 138 |

NOTE: Any antioxidants known to those skilled in the art may be used. Irganox ™ 1010, Irganox ™ 1076, and Irganox ™ 565 were used in the above examples. These ingredients are not essential to the performance characteristics of these examples.

Example 4 and Comparative Examples O & P

Figure 1:
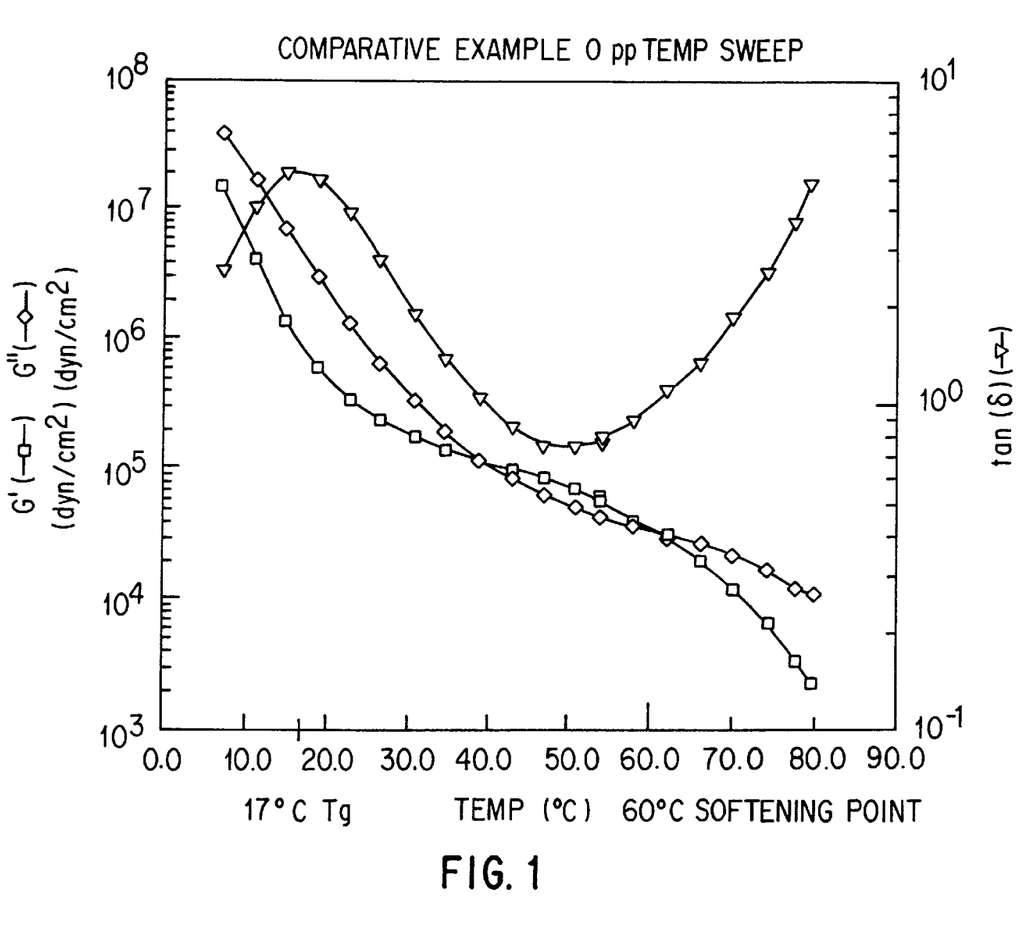
FIGS. 1 to 3 depict rheological measurements illustrating the highest heat resistance achieved with a lower weight percentage of the radial SIS versus a linear SBS and a linear SEBS. The glass transition temperature illustrates the cold temperature flexibility that is maintained with the radial SIS while the softening point illustrates the superior heat resistance obtained at a lower polymer load versus the linear SBS and linear SEBS. The higher heat resistance achievable with the radial SIS is further emphasized by the fact that Example 4 contains plasticizer level than comparative examples O & P, which typically lowers the heat resistance.
Figure 2:
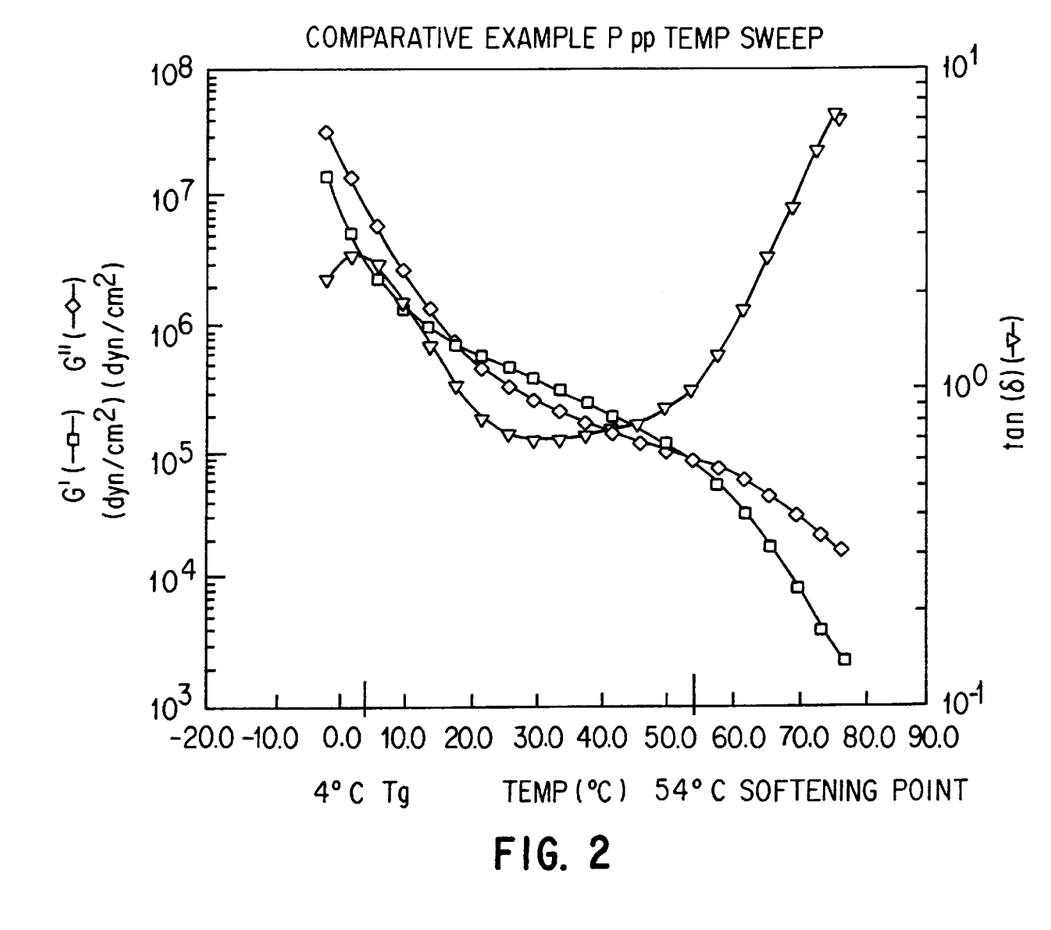
Figure 3:
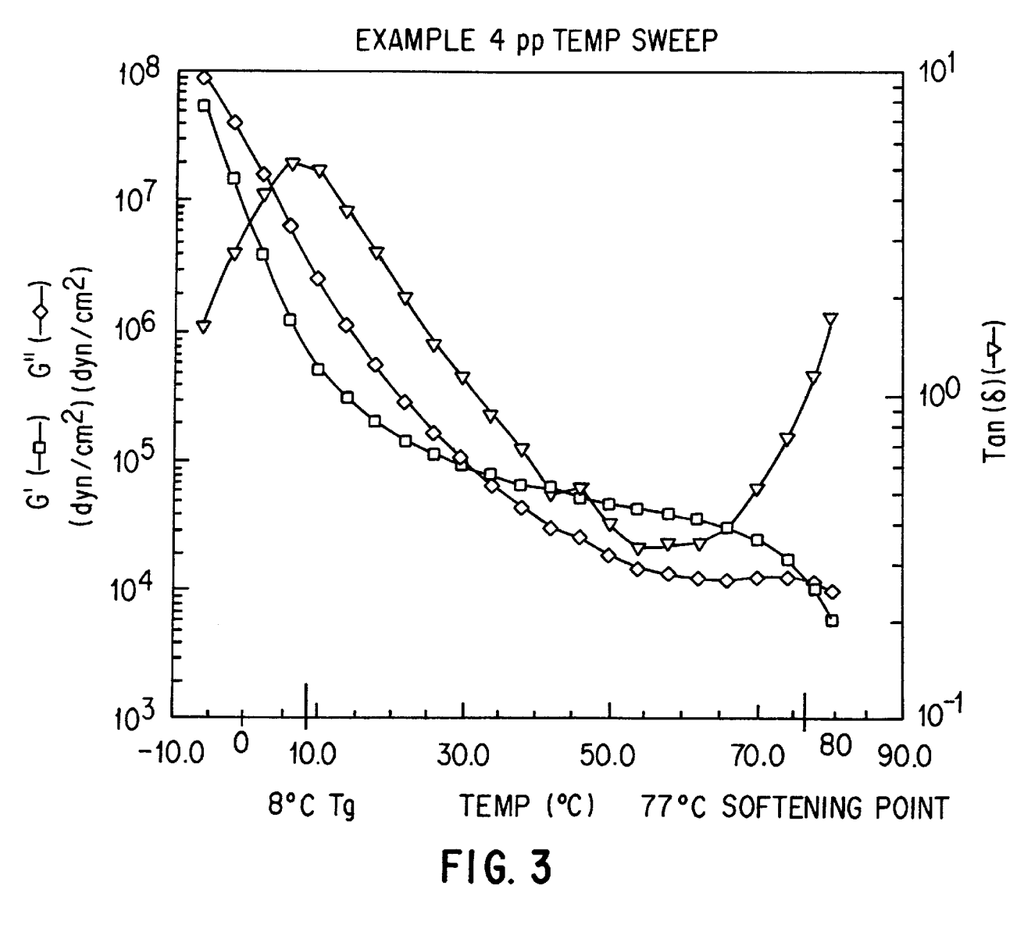

The following examples use rheological measurements to illustrate the higher heat resistance achieved with a lower weight percentage of the radial SIS versus a linear SBS and a linear SEBS. The glass transition temperature illustrates the cold temperature flexibility that is maintained with the radial SIS while the softening point illustrates the superior heat resistance obtained at a lower polymer load versus the linear SBS and linear SEBS. The higher heat resistance achievable with the radial SIS is further emphasized by the fact that Example 4 contains a higher plasticizer level than comparative examples O & P, which typically lowers the heat resistance.

TABLE 4

| Adhesive Components | O | P | 4 |
|---|---|---|---|
| Rubber Type | SBS | SEBS | Radial SIS |
| Escorez 5400 | — | — | 15.0 |
| Escorez 5600 | — | 39.0 | 40.0 |
| Regalrez 1018 | — | 22.5 | — |
| Sylvatac 1103 | 58.5 | — | — |
| Kaydol Oil | 24.0 | 15.0 | 29.0 |
| Parapol 1300 | — | — | 3.0 |
| Kraton G 1726 | — | 17.5 | 3.0 |
| Kraton G 1657 | — | 5.0 | — |
| Stereon 840A | 16.5 | — | — |
| DPX-552 | — | — | 10.0 |
| Antioxidant | 1.0 | 1.0 | — |
| Viscosity @ 300° F. | 790 | 1,650 | 390 |
| Glass Transition Temp Tg (° C.) | 17° C. See FIG. 1 | 4° C. See FIG. 2 | 8° C. See FIG. 3 |
| Softening Point (° C.) | 60° C. See FIG. 1 | 54° C. See FIG. 2 | 77° C. See FIG. 3 |

NOTE: Any antioxidants known to those skilled in the art may be used. Irganox ™ 1010, Irganox ™ 1076, and Irganox ™ 565 were used in the above examples. These ingredients are not essential to the performance characteristics of these examples.

We claim:

1. A hot melt adhesive composition, comprising:
   a) about 5 to 10% by weight of the adhesive of at least one radial block copolymer having the general configuration $(pS—pI—pB)_nX$ or $(pS—pI)_nX$ wherein pS is polystyrene, pI is polyisoprene and pB is polybutadiene, X is a multifunctional coupling agent and n is a number greater than 2, and said block copolymer having an average molecular weight from about 90,000 to about 380,000;
   b) 0 to about 10% by weight of a second polymer;
   c) about 30% to about 60% by weight of the adhesive of at least one tackifying resin; and
   d) about 20% to about 40% by weight of the adhesive of at least one plasticizer;
   wherein the total polymer content does not exceed 15% and the resultant shear adhesion failure temperature is greater than about 55° C.

2. The adhesive of claim 1 wherein said radial block copolymer has a coupling efficiency of greater than about 60%.

3. The adhesive of claim 1 wherein the tackifying resin is selected from the group consisting of aliphatic, cycloaliphatic and aromatic hydrocarbons and hydrogenated derivatives thereof, terpenes, modified terpenes, rosins, rosin derivatives, and mixtures thereof.

4. The adhesive of claim 1 wherein the tackifying resin has a Molten Gardner Color of less than about 3.

5. The adhesive of claim 1 wherein the tackifying resin is at least partially hydrogenated.

6. The adhesive of claim 1 wherein the second polymer is selected from the group consisting of homopolymers, copolymers, and terpolymers of ethylene; homopolymers, copolymers, and terpolymers of propylene, rubbery block copolymers and mixtures thereof.

7. The adhesive of claim 1 wherein the plasticizer is selected from the group consisting of naphthenic oil, paraffinic oil, polybutene, liquid elastomers, liquid tackifiers and mixtures thereof.

8. The adhesive of claim 1 wherein the radial block copolymer has an average molecular weight from about 100,000 to about 250,000, a styrene content from about 20% to about 30% by weight of the polymer, and a coupling efficiency greater than about 70%; the second polymer is a block copolymer selected from the group consisting of A—B diblock, A—B—A—B—A—B multiblock, A—B—triblock, a second radial block copolymer, and grafted versions thereof; the tackifying resin is selected from the group consisting of aliphatic, cycloaliphatic and aromatic hydrocarbons, hydrogenated derivatives thereof, and mixtures thereof, said tackifying resin having a Ring and Ball softening point of about 70° C. to about 150° C.; the plasticizer is selected from the group consisting of naphthenic and paraffinic oil; and said adhesive composition further comprises a stabilizer.

9. A hot melt adhesive composition, comprising:

a) about 5% to about 10% by weight of the adhesive of at least one radial block copolymer having the general configuration $(pS—pI—pB)_nX$ or $(pS—pI)_nX$ wherein pS is polystyrene, pI is polyisoprene, pB is polybutadiene, X is a multifunctional coupling agent and n is a number greater than 2 and said block copolymer having an average molecular weight from about 90,000 to about 380,000;

b) 0 to about 10% by weight of the adhesive of a second polymer;

c) about 30% to about 60% by weight of the adhesive of at least one tackifying resin; and d) about 20% to about 40% by weight of the adhesive of at least one plasticizer; wherein the total polymer content does not exceed 15%, the resultant shear adhesion failure temperature is greater than about 50° C. and the viscosity of the resultant adhesive is less than about 3000 cPs at about 120° C.

10. The adhesive of claim 9 wherein the tackifying resin is selected from the group consisting of aliphatic, cycloaliphatic and aromatic hydrocarbons and hydrogenated derivatives thereof, terpenes, modified terpenes, rosins, rosin derivatives, and mixtures thereof.

11. The adhesive of claim 9 wherein the tackifying resin has a Molten Gardner Color of less than about 3.

12. The adhesive of claim 9 wherein the second polymer is selected from the group consisting of homopolymers, copolymers, and terpolymers of ethylene; homopolymers, copolymers, and terpolymers of propylene, rubbery block copolymers, and mixtures thereof.

13. The adhesive of claim 9 wherein the plasticizer is selected from the group consisting of naphthenic oil, paraffinic oil, polybutene, liquid elastomers, liquid tackifiers and mixtures thereof.

14. The adhesive of claim 9 wherein the at least one radial block copolymer having the general configuration $(pS—pI—pB)_nX$ or $(pS—pI)_nX$ wherein n is a number greater than 2, has a molecular weight from about 100,000 to about 250,000, a styrene content from about 20% to about 30% by weight of the polymer, and a coupling efficiency greater than about 70%; the second polymer is a block copolymer selected from the group consisting of A—B diblock, A—B—A—B—A—B multiblock, A—B—A triblock, a second radial block copolymer and grafted versions thereof; the tackifying resin is selected from the group consisting of aliphatic, cycloaliphatic and aromatic hydrocarbons, hydrogenated derivatives thereof, and mixtures thereof, having a Ring and Ball softening point of about 70° C. to about 150° C.; the plasticizer is selected from the group consisting of naphthenic and paraffinic oil; and said adhesive composition further comprises a stabilizer.

15. The adhesive of claim 9 wherein the resultant Shear Adhesion Failure Temperature is greater than about 55° C.

16. The adhesive of claim 9 wherein said adhesive is applied to a label.

* * * * *